3,141,879
PHENYL PYRAZOLINE CARBOXYLIC
ACID ESTERS
Heinrich Häusermann, Riehen, near Basel, and Hans
Ulrich Meyer, Basel, Switzerland, assignors to J. R.
Geigy A.-G., Basel, Switzerland
No Drawing. Filed Nov. 29, 1961, Ser. No. 155,792
Claims priority, application Switzerland Nov. 30, 1960
6 Claims. (Cl. 260—247.2)

The invention concerns basic esters of phenylpyrazoline carboxylic acids, processes for the production thereof, their use for improving the appearance of acrylonitrile polymers and, as an industrial product, the material the appearance of which is improved with their aid.

It has been found that compounds suitable for the brightening of polymeric and copolymeric acrylonitrile are obtained if an alkanol containing basic tertiary or quaternary nitrogen is esterified with a reactive functional derivative of a 1-(4'-carboxyphenyl)-3-phenylpyrazoline which can contain lower alkyl groups in the 4-position and lower alkyl groups or phenyl groups in the 5-position. The new esters correspond to the general Formulae I and II

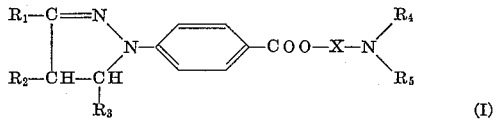

and

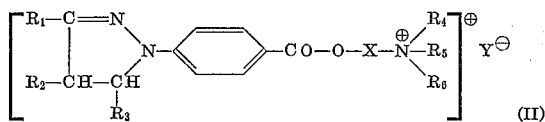

wherein $R_1$ represents an unsubstituted phenyl radical or a phenyl radical substituted by halogen, lower alkyl or lower alkoxy groups, $R_2$ represents hydrogen or a lower alkyl radical, $R_3$ represents hydrogen, a lower alkyl group or an unsubstituted phenyl radical or a phenyl radical further substituted by non-ionogenic substituents with the exception of the nitro group, X represents a lower alkylene radical, $R_4$ and $R_5$ independently of each other represent a lower alkyl, hydroxyalkyl, alkoxyalkyl, hydroxyalkleneoxyalkyl, cyanoalkyl or aralkyl groups, $R_4$ and $R_5$ together with the nitrogen atom, possibly with the inclusion of oxygen or further nitrogen, also represent a heterocyclic ring, $R_6$ represents an alkyl or aralkyl radical possibly containing inert substituents, and Y represents the anion of an acid.

In the Formulae I and II:

$R_1$ is principally a p-halogenphenyl radical, in particular the p-chlorophenyl radical or also the p-bromo- or p-fluorophenyl radical; in the second instance $R_1$ is an unsubstituted phenyl radical, also a methylphenyl, dimethylphenyl, chloromethylphenyl, ethylphenyl, isopropylphenyl, methoxyphenyl, ethoxyphenyl, propoxyphenyl or butoxyphenyl radical;

$R_2$ represents principally hydrogen, or, in the alternative, a radical such as methyl, ethyl, n- or iso-propyl, butyl radical;

$R_3$ represents principally hydrogen, or, in the alternative, an unsubstituted phenyl radical or any desired non-ionogenic substituted phenyl radical, except that said radical can not be substituted with color-producing substituents such as nitro or arylazo groups; thus, the substituted phenyl group may be, e.g., a chlorophenyl, bromophenyl, methylphenyl, dimethylphenyl, ethylphenyl, methoxyphenyl, dialkylsulphamylphenyl, alkylsulphonylphenyl radical whereby several identical or different substituents of those mentioned can be present;

$R_4$ and $R_5$ independently of each other principally represent lower alkyl groups such as methyl, ethyl, n-propyl, isopropyl, n-butyl groups, also substituted lower alkyl groups such as hydroxyethyl, hydroxypropyl, 2,3-dihydroxypropyl, cyanoethyl, methoxyethyl, ethoxyethyl or β-hydroxyethoxyethyl groups. If $R_4$ and $R_5$ together with the nitrogen represent heterocyclic compounds, then they are principally pyrrolidino, piperidino, morpholino or an N'-alkylpiperazino radical such as, e.g., N'-methyl-piperazino or N'-ethyl-piperazino radical;

X represents a lower alkyl radical, principally the ethylene and the 1,2- or 1,3-propylene group, or, in the alternative, the 1,4-, 2,3- or 1,3-butylene group;

$R_6$ represents, for example, a lower alkyl radical, e.g., the methyl, ethyl, n-propyl or n-butyl radical or an aralkyl radical, e.g., the benzyl radical, p-methylbenzyl radical or p-chlorobenzyl radical;

Y represents the anion of an inorganic acid, e.g., of a halogen hydracid or of sulphuric acid which may be esterified once with lower alkanols or an organic sulphonic acid, e.g., an arylsulphonic acid such as benzene or p-toluene sulphonic acid.

The uncoloured anion Y of the quaternary ammonium salts according to the invention has practically no influence on the brightening properties. Its function corresponds to that of the uncoloured cations, e.g., the alkali metal cations, in sulphonated textile dyestuffs. The anion Y corresponds primarily to the acid radical of the quaternising agent $R_6$—Y.

If the phenyl pyrazoline carboxylic acid esters produced according to the invention correspond to general Formula I then they can form salts with inorganic and organic acids, which salts dissolve easily to very easily in water. By reaction with a reactive ester of the general Formula III $$R_6—Y \qquad (III)$$

wherein $R_6$ and Y have the meanings given above, they can also be converted into the corresponding quaternary ammonium compounds which can be purified very well from polar solvents such as lower alkanols, e.g., methanol or ethanol, or low aliphatic ketones such as acetone.

Examples of reactive esters of Formula III usable according to the invention are the methyl, ethyl, propyl, butyl or benzyl esters of hydrochloric or hydrobromic acids, or the dimethyl or diethyl esters of sulphuric acid or the methyl or ethyl esters of benzene sulphonic acid or p-toluene sulphonic acid.

The reaction of the compound of Formula I with the reactive ester of Formula III to form the compound of Formula II is performed advantageously by heating the two starting components in an inert organic solvent. Examples of inert organic solvents are, for example, halogenated or nitrated aromatic hydrocarbons such as halogen- or nitro-benzenes, or halogenated aliphatic hydrocarbons, e.g., trichloroethylene or tetrachloroethane, as well as low alkanols such as methanol or ethanol.

As starting materials for the process according to the invention, primarily tertiary alkanolamines are employed, for example, dimethylamino-, diethylamino-, dipropylamino-, dibutylamino-ethanol or -propanol, also pyrrolidino-, piperidino-, morpholino-, N'-methyl- or N'-ethyl-piperazino-ethanol or -propanol as well as the quaternary ammonium salts derived therefrom.

The alkanols containing quaternised nitrogen are obtained, for example by reacting the corresponding alkanols containing a tertiary amino group with a reactive ester of Formula III.

As reactive functional derivatives of a 1-(4'-carboxyphenyl)-3-phenyl-pyrazoline, principally the carboxylic acid halides, particularly the carboxylic acid chlorides but also the carboxylic acid esters, mainly the carboxylic acid esters with lower alkanols such as the methyl or ethyl esters are employed. These derivatives are obtained by reacting the corresponding carboxylic acids with the usual halogenating or esterification agents.

According to the invention, reactive functional derivatives of 1-(4'-carboxyphenyl)-3-phenyl-pyrazolines are used advantageously which are unsubstituted in the 4- and 5-positions. Of these, 1-(p-chlorocarbonylphenyl)-3-(p-chlorophenyl)-pyrazoline is the preferred starting material because of the favourable shade of its fluorescence; also corresponding 1 - (p-chlorocarbonylphenyl)-3-(4'-fluorophenyl)-pyrazoline and -3-(3',4'-dichlorophenyl)-pyrazoline are favourable.

To attain end products having improved fastness to light, advantageously the corresponding compounds are used which are also substituted in the 5-position, particularly by phenyl groups. However, reactive functional derivatives of 1 - (4'-carboxyphenyl)-3-phenyl-pyrazolines can also be used which are substituted in the 4- and 5-positions as defined.

The basic esters according to the invention are produced from the corresponding pyrazoline carboxylic acid halides and alkanols containing tertiary nitrogen advantageously in inert solvents such as, e.g., aromatic hydrocarbons or lower aliphatic ketones in the presence of acid binding agents. Tertiary amines such as, e.g., excess alkanol containing tertiary nitrogen can be used, for example, as acid binding agents.

For the transesterification of a 1-(p-carbalkoxyphenyl)-3-phenyl-pyrazoline with an alkanol containing tertiary nitrogen, the usual transesterification catalysts are used, e.g., sodium methylate or sodium ethylate. The transesterification is performed at a raised temperature; excess alkanol containing tertiary nitrogen or an inert diluent such as, e.g., benzene or toluene can be used as solvent. The low alcohol formed by the transesterification is advantageously removed by continual distillation (displacement of the reaction equilibrium).

A modification of the production process consists in reacting, possibly in the presence of inert diluents, a metal salt of a 1-(4'-carboxyphenyl)-3-phenyl-pyrazoline which can contain lower alkyl groups in the 4-position and lower alkyl or phenyl groups in the 5-position, e.g., reacting a suspension of the alkali metal salts in hydrocarbons or chlorinated hydrocarbons, with the ester of an alkanol containing tertiary or quaternary nitrogen and a strong acid, e.g., an alkyl chloride or bromide or alkanol aryl sulphate containing tertiary or quaternary nitrogen.

For this modified production process, the esters of the tertiary aminoalkanols mentioned above, e.g., the dimethylamino, diethylamino, morpholino, piperidino, pyrrolidino, N'-methyl-piperazino or N'-ethyl-piperazino ethanols or propanols and strong mineral acids, particularly halogen hydracids or aryl sulphonic acids as well as the quaternary ammonium salts derived therefrom are used as starting materials.

A further modification of the process for the production of basic esters of phenyl pyrazoline carboxylic acids of the general Formulae I and II consists in reacting a reactive ester of a phenyl pyrazoline carboxylic acid of the general Formula IV

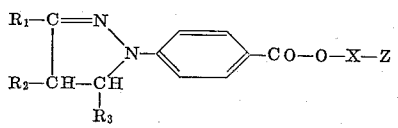

(IV)

with a secondary amine of the general formula

or with a tertiary amine of the general formula

wherein $R_1$ to $R_6$ and X have the meanings given above and Z is halogen or $-OSO_2-$ aryl. The starting materials of the general Formula IV necessary for this process are obtained, for example, by reacting a reactive functional derivative of a 1-(4'-carboxyphenyl)-3-phenyl pyrazoline with compounds of the general Formula V $$HO-X-Z \qquad (V)$$

wherein X and Z have the meanings given above, or by reacting metal salts of a 1-(4'-carboxyphenyl)-3-phenyl-pyrazoline with halogen alkyl halides.

The end products of general Formula I are purified if desired by dissolving out excess alkanolamines with water and, possibly by removal of carboxylic acid formed by hydrolysis by converting into the alkali metal salts, e.g., with dilute aqueous solutions of caustic soda lye or sodium carbonate. The products are further worked up by the usual methods.

Preferred esters are those having the formulae

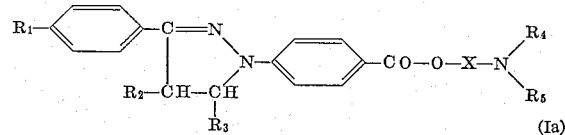

(Ia)

and

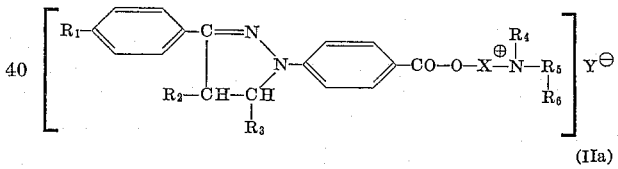

(IIa)

wherein $R_1$ is hydrogen, the methyl or methoxy group, chlorine or fluorine, $R_2$ is hydrogen or the methyl group, $R_3$ is hydrogen, the methyl or ethyl group, X is the $-CH_2-CH_2-$ or $-CH_2-CH_2-CH_2-$ group, $R_4$ and $R_5$ independently of each other are an alkyl radical having 1 to 4 carbon atoms and $R_4$ and $R_5$ together with the corresponding nitrogen atom is pyrrolidino, piperidino, morpholino, N-methyl-piperazino or the ethyl-piperazino group, $R_6$ is the methyl, ethyl, benzyl, methylbenzyl or chlorobenzyl group and Y is an anion.

Particularly good brightening agents are those esters having the Formula Ia. Of these particularly good esters, the compounds having the formula

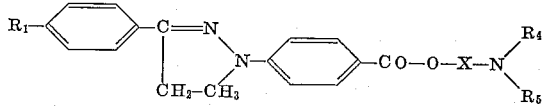

wherein $R_1$ is chlorine or fluorine, $R_4$ and $R_5$ are each an alkyl radical having 1 to 4, advantageously 1-2, carbon atoms and $R_4$ and $R_5$ together with the corresponding nitrogen atom is the pyrrolidnio, piperidino, morpholino, N-methyl-piperazino and N-ethyl-piperazino group, and X is the $-CH_2-CH_2-$ or $-CH_2-CH_2-CH_2-$ group, are especially valuable. Of these, again those are preferred wherein $R_1$ is chlorine, $R_4$ and $R_5$ are alkyl radicals with at most 2 carbon atoms and X is the —$CH_2$—$CH_2$— group.

The basic esters of 1-(4'-carboxyphenyl)-3-phenyl-pyrazolines corresponding to Formula I according to the invention are soluble in dilute aqueous acids. As mixtures with acid salts, e.g., with alkali bisulphates, they can be worked up into dry powders which are water soluble.

Under the usual dyeng conditions, the esters of phenyl pyrazoline carboxylic acids of the general Formulae I and II according to the invention draw from an acid aqueous solution onto polymeric and copolymer acrylonitrile fibres and textiles. In daylight, they lend to yellowed fibres and textiles made from acrylonitrile polymers, even in slight amounts of, e.g., 0.005 to 0.5%, a greatly improved, more white appearance.

The following examples illustrate the invention. Where not otherwise stated, parts are given therein as parts by weight and the temperatures are in degrees centigrade. The relationship of parts by weight to parts by volume is as that of grammes to cubic centimetres.

*Example 1*

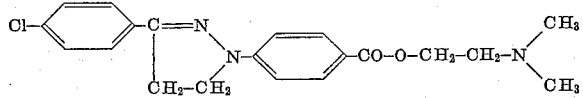

64 parts of 1-(p-chlorocarbonylphenyl)-3-(4'-chlorophenyl)-pyrazoline are dissolved in 1000 parts by volume of hot toluene and the solution obtained is added, while stirring at 75–85°, to a mixture of 36 parts of N,N-dimethyl-2-hydroxyethylamine and 500 parts by volume of toluene. After stirring for a short time, the mixture is cooled to 0–10°, the precipitate which crystallises out is filtered off under suction, washed with cold water and dried in vacuo at 70°. The 1-phenyl-3-(p-chlorophenyl)-pyrazoline-4'-carboxylic acid-β-dimethylaminoethyl ester crystallises from benzene/ligroin into fine, yellow long needles which melt at 161°.

*Analysis.*—$C_{20}H_{22}ClN_3O_2$ — Calculated: 64.59% C.; 5.96% H; 9.54% Cl; 11.30% N. Found: 64.51% C; 6.10% H; 9.53% Cl; 11.01% N.

In organic solution, the product has a vivid blue to blue-violet fluorescence and is excellently suitable for the brightening of polyacrylonitrile fibres.

Further amounts of the basic esters can be obtained by concentrating the toluene mother liquor and precipitating with petroleum ether.

Brightening agents having a similar action are obtained if, in this example, the 36 parts of N,N-dimethyl-2-hydroxyethylamine are replaced by:

47 parts of N,N-diethyl-2-hydroxyethylamine,
42 parts of N,N-dimethyl-3-hydroxypropylamine,
53 parts of N,N-diethyl-3-hydroxypropylamine,
47 parts of N-hydroxyethylpyrrolidine,
52 parts of N-hydroxyethylpiperidine,
53 parts of N-hydroxyethylmorpholine,
59 parts of N-(γ-hydroxypropylene)-morpholine,
58 parts of N-(β-hydroxyethyl)-N'-methylpiperazine,
64 parts of N-(β-hydroxyethyl)N'-ethylpiperazine,
58 parts of N,N-dipropyl-2-hydroxyethylamine, or by
70 parts of N,N-dibutyl-2-hydroxyethylamine.

*Example 2*

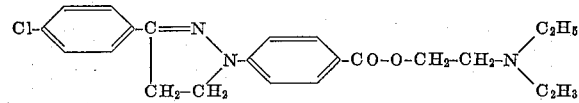

50 parts of N,N-diethyl-2-hydroxyethylamine are dissolved in 500 parts of acetone and 63.8 parts of 1-(p-chlorocarbonylphenyl) - 3 - (p-chlorophenyl)-pyrazoline are added at 0–10° while stirring. The yellow suspension is then stirred for 2 hours at 10–20°, then heated to 50–55°, undissolved particles are filtered off and washed with 100–200 parts by volume of acetone. The product is precipitated from the yellow acetone solution with cold water, filtered off, washed with water and, after drying, purified by recrystallisation from ligroin. The 2-diethylaminoethanol ester of 1-(p-carboxyphenyl)-3-(p-chlorophenyl)-pyrazoline so obtained forms small, yellowish crystals which melt at 118°. The product dissolves very well in benzenes when it then has an intensive, blue-violet fluorescence. The aqueous solution of the hydrochloride is yellowish coloured and has a blueish fluorescence only in relatively great dilution.

The product can be used for the brightening of polyacrylonitrile fibres according to Examples 12 to 14.

Products having an equally good action for use for the purpose mentioned are also obtained if in this example, the 63.8 parts of 1-(p-chlorocarbonylphenyl)-3-(p-chlorophenyl)-pyrazoline are replaced by the equivalent amount of acid chloride of the following pyrazoline carboxylic acids:

1-(p-carboxyphenyl)-3-phenyl-pyrazoline,
1-(p-carboxyphenyl)-3-(p-methylphenyl)-pyrazoline,
1-(p-carboxyphenyl)-3-(p-fluorophenyl)-pyrazoline,
1-(p-carboxyphenyl)-3-(p-methoxyphenyl)-pyrazoline,
1-(p-carboxyphenyl)-3-phenyl-4-methyl-pyrazoline,
1-(p-carboxyphenyl) - 3 - (p-chlorophenyl) - 4 - methyl-pyrazoline,
1-(p-carboxyphenyl) - 3 - (p-chlorophenyl) - 5 - methyl-pyrazoline,
1-(p-carboxyphenyl)-3-phenyl-5-methyl-pyrazoline,
1-(p-carboxyphenyl) - 3 - (p-chlorophenyl) - 5 - ethyl-pyrazoline, or
1-(p-carboxyphenyl)-3-phenyl-5-ethyl-pyrazoline,
1-(p-carboxyphenyl) - 3 - (p-fluorophenyl) - 5 - methyl-pyrazoline.

*Example 3*

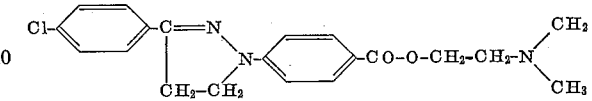

18 parts of 1-(p-carbomethoxyphenyl)-3-(p-chlorophenyl)-pyrazoline are slurried, with stirring, in 25 parts of N,N-dimethyl-2-hydroxyethylamine, 0.3 part of sodium methylate are added and the whole is heated for 2 hours at 110–115°. 5 parts by volume of a mixture of methanol and N,N-dimethyl-2-hydroxyethylamine are then distilled off through a sloping condenser, during which process the inner temperature rises to 125–130°. A mixture of 50 parts by volume of benzene and 25 parts by volume of ligroin is added at 70–80° to the thick yellow broth obtained, the whole is well homogenised and filtered at 10–20°.

The pale yellowish crude product is washed free of amine with cold water, dried and purified by recrystallisation from benzene/benzine. The product obtained melts at 160–161° and is identical with the 2-dimethylaminoethanol ester produced according to Example 1.

20 parts of the β-dimethylaminoethyl ester of 1-(p-carboxyphenyl) - 3 - (p-chlorophenyl)-pyrazoline obtained above are dissolved in 200 parts by volume of 2 N hydrochloric acid and 200 parts of water. The clear solution is cooled to 0–5° and the hydrochloride of the basic ester which crystallises out is filtered off. The crude product is recrystallised from ethanol. The pure salt dissolves well in water and melts at 245–247°.

*Example 4*

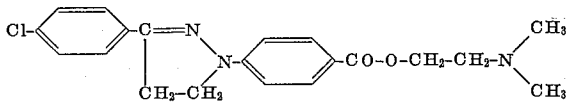

30 parts of the sodium salt of 1-(p-carboxyphenyl)-3-(p-chlorophenyl)-pyrazoline are suspended in 450 parts of chlorobenzene and the suspension is heated to 80° while stirring well. A solution of 14 parts of N,N-dimethylaminoethyl chloride in 50 parts of chlorobenzene is added dropwise within 1 hour at this temperature. On completion of the addition, the whole is heated for 5 hours at 110°. Precipitated sodium chloride is filtered off from the solution and the filtrate is concentrated to a quarter of its volume. On cooling to 0–5°, the product crystallises into beautiful small needles. It is filtered off and washed with a little methanol.

The yellowish crude product is distinguished by great purity and does not need to be recrystallised. It melts at 159–160° and is identical with the compound produced according to Examples 1 and 3.

Equally active products are obtained in an analogous manner if in this example the 30 parts of the sodium salt of 1-(p-carboxyphenyl)-3-(p-chlorophenyl)-pyrazoline are replaced by the equivalent amounts of the sodium salts of the following acids:

1-(p-carboxyphenyl)-3-phenyl-pyrazoline,
1-(p-carboxyphenyl)-3-(p-methylphenyl)-pyrazoline,
1-(p-carboxyphenyl)-3-(p-fluorophenyl)-pyrazoline,
1-(p-carboxyphenyl)-3-(p-methoxyphenyl)-pyrazoline.

*Example 5*

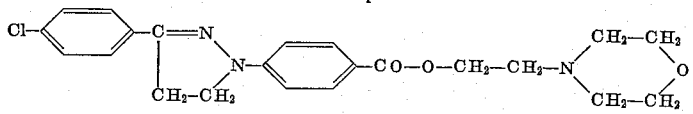

9 parts of 2-chloroethyl ester of 1-(p-carboxyphenyl)-3-(p-chlorophenyl)-pyrazoline and 8 parts of morpholine are heated for 36 hours at 120–130° in 60 parts of chlorobenzene. The mixture is evaporated to dryness in vacuo. The residue is taken up in hot alcohol. On cooling to 0°, the product crystallises out. It can be recrystallised from ligroin. The pure product melts at 157–159°.

*Example 6*

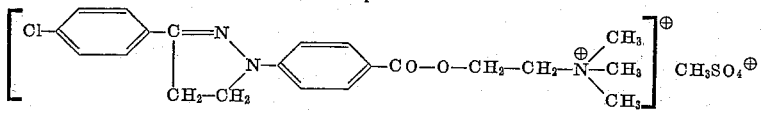

8 parts of β-dimethylaminoethyl ester of 1-(4'-carboxyphenyl)-3-(4''-chlorophenyl)-pyrazoline are dissolved by warming in 160 parts by volume of methanol. 10 parts by volume of dimethyl sulphate are added and the mixture is then refluxed for 2 hours. The solution is cooled to 0–5°, the compound which crystallises out is filtered off under suction and washed with a little cold methanol. The still moist crude product is recrystallised from methanol and then dried in vacuo at 50–60°. The pure product melts at 226–228°.

*Example 7*

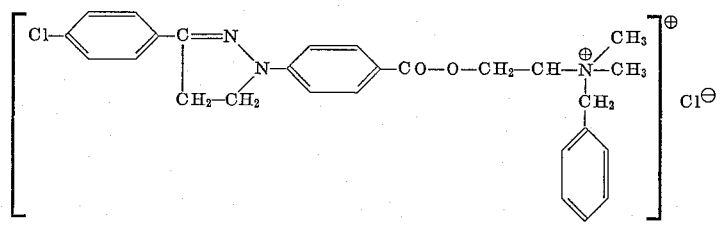

15 parts of β-dimethylaminoethyl ester of 1-(4'-carboxyphenyl)-3-(4''-chlorophenyl)-pyrazoline are dissolved in 100 parts by volume of chlorobenzene. 7.5 parts of benzyl chloride are added to the solution while stirring well whereupon the salt formed precipitates almost immediately. The mixture is stirred for another 30 minutes at 120°, then cooled to 0–10° and filtered. The product recrystallised from ethanol, melts at 254–256°.

If, instead of 7.5 parts of benzyl chloride, 16 parts of p-chlorobenzyl chloride are used, then a quaternary salt is obtained in an analogous manner which when recrystallised from ethanol, melts at 243–244°.

*Example 8*

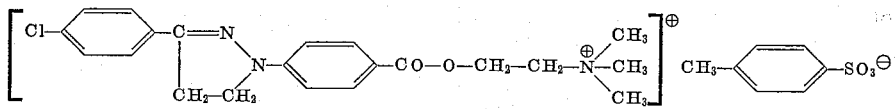

7.5 parts of p-toluene sulphonic acid methyl ester are added while stirring well at 50° to a solution of 10 parts of β-dimethylaminoethyl ester of 1-(4'-carboxyphenyl)-3-(4''-chlorophenyl)-pyrazoline in 100 parts of chlorobenzene. The quaternary salt precipitates immediately. The mixture is stirred for another 15 minutes at 100° after which the crude product is filtered off under suction and washed with ether. Recrystallised from ethanol, the salt melts at 230°–232°.

*Example 9*

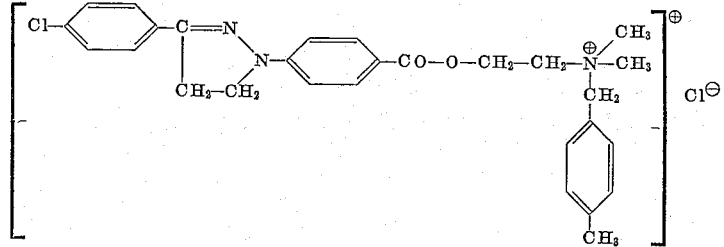

10 parts of β-dimethylaminoethyl ester of 1-(4'-carboxyphenyl)-3-(4''-chlorophenyl)-pyrazoline are dissolved by warming in 100 parts of chlorobenzene. 5.6 parts of p-methylbenzyl chloride are added to the clear solution and the whole is heated for 3 hours at 120° while stirring well. The mixture is cooled to 0–5° and the product which precipitates is filtered off. It is washed with a little chlorobenzene.

The greenish yellow crude product is recrystallised from ethanol. The salt dissolves well in water; it melts at 238–240°.

*Example 10*

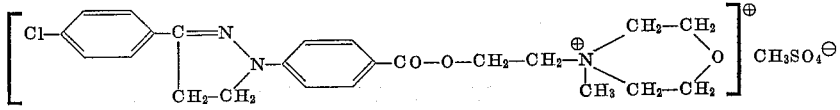

15 parts of 2-morpholino-(N)-ethyl ester of 1-(4'-carboxyphenyl)-3-(4''-chlorophenyl-pyrazoline are dissolved in 150 parts of benzene and 9.5 parts of dimethyl sulphate are added. The mixture is refluxed for 3 hours whereupon the salt formed separates out first in oily form which slowly becomes crystalline. It is filtered off, washed with a little benzene and recrystallised from ethanol.

The product melts at 180–183° and has good water solubility.

*Example 11*

100 parts of a polyacrylonitrile staple fibre fabric (Type Orlon 42, Du Pont, Wilmington, U.S.A.) are introduced into a liquor which contains 0.02 part of the brightening agent according to Example 6 and 4 parts of formic acid in 4000 parts of water.

The temperature is raised within 30 minutes to 95° and the liquor is kept for 30 minutes at 95°. The fabric is then rinsed first with lukewarm and then with cold water and afterwards dried. The material so treated has a considerably more white appearance in daylight than an untreated sample.

*Example 12*

20 parts of a polyacrylonitrile fabric (marketed as "Orlon" Type 42, E. I. du Pont de Nemours, Wilmington, Del., U.S.A.) are introduced at 55° into a liquor which contains 0.01 part of the basic ester obtained according to Example 1 and 1.0 part of formic acid in 600 parts of water. The temperature of the bath is raised to 95° within 15 minutes and the liquor is kept at this temperature for 30 minutes. After rinsing and drying, the fabric so treated has a brilliant white appearance.

*Example 13*

10 parts of the basic ester

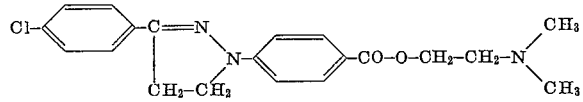

are thoroughly mixed with 90 parts of sodium hydrogen sulphate and worked up into a homogeneous powder. The pale yellowish preparation dissolves in water with a yellowish colour and, in great dilution, has a blueish fluorescence in daylight.

20 parts of polyacrylonitrile yarn ("Orlon" Type 42, Du Pont, Wilmington, U.S.A.) are introduced at 50° into a liquor which contains 0.02 part of the acid preparation described above and 6 parts of formic acid in 800 parts of water.

The temperature is raised to 95° within 15 minutes and held there for 20 minutes. After the usual rinsing and drying, a yarn is obtained which has a brilliant white appearance in daylight.

*Example 14*

100 parts of a polyacrylonitrile staple fibre fabric (Type "Orlon" 42, Du Pont, Wilmington, U.S.A.) are introduced into a liquor which contains 0.01 part of the basic ester

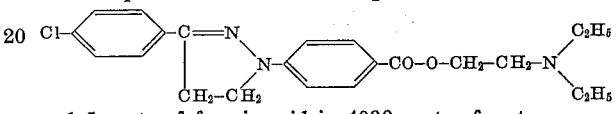

and 5 parts of formic acid in 4000 parts of water.

The temperature of the liquor is raised to 90° within 30 minutes and held at 90–95° for 30 minutes. The fabric is then rinsed first with lukewarm and then with cold water and afterwards dried. The material so treated has a considerably more white appearance in daylight than an untreated sample.

What is claimed is:

1. A member selected from the group consisting of compounds of the formulae

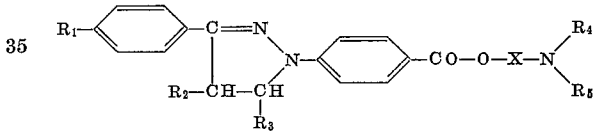

and

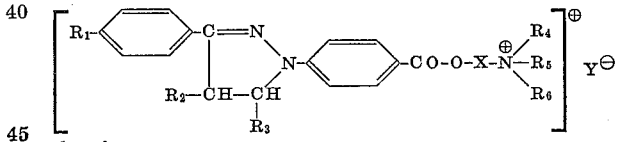

wherein $R_1$ is a member selected from the group consisting of hydrogen, methyl, methoxy, chlorine and fluorine, $R_2$ is a member selected from the group consisting of hydrogen and methyl, $R_3$ is a member selected from the group consisting of hydrogen, methyl and ethyl, X is a member selected from the group consisting of —$CH_2$—$CH_2$— and —$CH_2$—$CH_2$—$CH_2$—, $R_4$ is alkyl of from 1 to 4 carbon atoms, $R_5$ is alkyl of from 1 to 4 carbon atoms, and $R_4$ and $R_5$ together with the corresponding nitrogen atom is a member selected from the group consisting of pyrrolidino, piperidino, morpholino, N-methylpiperazino and N-ethylpiperazino, $R_6$ is a member selected from the group consisting of methyl, ethyl, benzyl, methylbenzyl and chlorobenzyl, and Y is an anion.

2. The ester of the formula

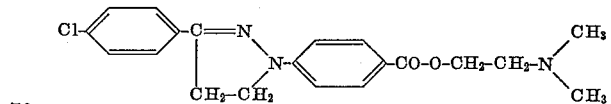

3. The ester of the formula

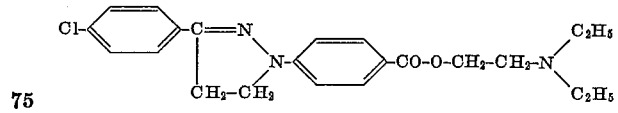

4. The ester of the formula
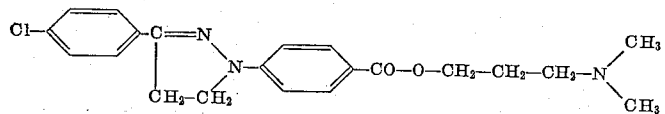
5. The ester of the formula
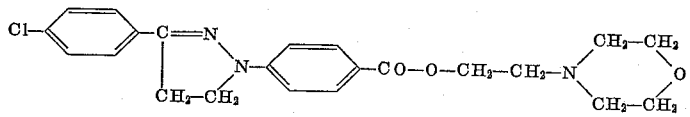
6. The ester of the formula
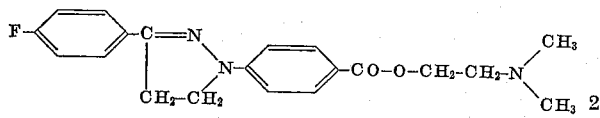
References Cited in the file of this patent
UNITED STATES PATENTS
| | | |
|---|---|---|
| 2,610,969 | Kendall et al. | Sept. 16, 1952 |
| 2,639,990 | Kendall et al. | May 26, 1953 |
| 2,640,056 | Kendall et al. | May 26, 1953 |
| 2,740,793 | Kendall et al. | Apr. 3, 1956 |
| 2,879,174 | Wagner et al. | Mar. 24, 1959 |